US009328025B2

(12) United States Patent
Blackburn et al.

(10) Patent No.: US 9,328,025 B2
(45) Date of Patent: May 3, 2016

(54) EFFECTIVE USE OF MELAMINE SULFONATE CONDENSATE DISPERSANTS IN WALLBOARD CONTAINING FOAM

(75) Inventors: David R. Blackburn, Barrington, IL (US); Michael P. Shake, Johnsburg, IL (US); Runhai Lu, Wauconda, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 40 days.

(21) Appl. No.: 13/153,670

(22) Filed: Jun. 6, 2011

(65) Prior Publication Data

US 2012/0172468 A1 Jul. 5, 2012

Related U.S. Application Data

(60) Provisional application No. 61/428,411, filed on Dec. 30, 2010.

(51) Int. Cl.
*C04B 28/12* (2006.01)
*C04B 28/04* (2006.01)
*C04B 28/14* (2006.01)

(52) U.S. Cl.
CPC .................................... *C04B 28/14* (2013.01)

(58) Field of Classification Search
CPC ............................. C04B 24/223; C04B 28/14
USPC ............................. 521/83; 423/554; 106/781
See application file for complete search history.

(56) References Cited

U.S. PATENT DOCUMENTS 5,643,510 A * 7/1997 Sucech ........................ 264/40.1
5,683,635 A * 11/1997 Sucech et al. .................. 264/42
6,384,111 B1 5/2002 Kistenmacher et al.
6,391,106 B2 5/2002 Moreau et al.
6,451,881 B1 9/2002 Vickers, Jr. et al.
6,648,962 B2 11/2003 Berke et al.
7,364,015 B2 * 4/2008 Englert et al. ................ 181/296
2004/0231916 A1 * 11/2004 Englert et al. ................ 181/296
2006/0278128 A1 * 12/2006 Liu et al. ....................... 106/661
2011/0054081 A1 * 3/2011 Dierschke et al. ................ 524/2

FOREIGN PATENT DOCUMENTS

DE 196 09 614 A1 9/1996
JP 2003020262 A * 1/2003
WO WO 2011/028817 A1 3/2011
WO WO 2011/029711 A1 3/2011

OTHER PUBLICATIONS

"Chapter 2: Superplasticizers" in Chemical Admixtures for Concrete. Ed. by Roger Rixom and Noel Mailvaganam Spon Press 1999.*

* cited by examiner

*Primary Examiner* — Mike M Dollinger
*Assistant Examiner* — Christina Wales
(74) *Attorney, Agent, or Firm* — Greer, Burns & Crain, Ltd.; Pradip Sahu; Philip T. Petti

(57) ABSTRACT

Effective use of dispersants in wallboard containing foam results from a method where stucco is mixed with a first dispersant and a first quantity of water to form a gypsum slurry. A soap is blended with a second dispersant and a second quantity of water to make a foam. Subsequently, the foam is combined with the slurry. Choice of different first and second dispersants and their relative amounts allows control of the size distribution of the foam bubbles in the slurry and the resulting voids in the gypsum core. Melamine sulfonate condensate and polycarboxylate dispersants are preferred dispersants.

11 Claims, No Drawings

EFFECTIVE USE OF MELAMINE SULFONATE CONDENSATE DISPERSANTS IN WALLBOARD CONTAINING FOAM

BACKGROUND

This invention relates to a method for controlling the properties of a foamed gypsum panel. More specifically, it relates to controlling core properties by producing voids of controlled sizes.

Gypsum-based building products are commonly used in construction. Wallboard made of gypsum is fire retardant and can be used in the construction of walls of almost any shape. Gypsum panels or wallboards have other uses, including acoustical and ceiling panels. They are used primarily as an interior product and have sound-deadening properties. They are relatively easily patched or replaced if they become damaged. There are a variety of decorative finishes that can be applied to the wallboard, including paint and wallpaper. Even with all of these advantages, it is still a relatively inexpensive building material.

One reason for the reasonable cost of wallboard panels is that they are manufactured by a process that is fast and efficient. A slurry used to form a core of the wallboard includes calcium sulfate hemihydrate and water that are blended in a mixer. As the slurry exits the mixer, foam generated from soap and water is added to the slurry before it is continuously deposited on a paper facing sheet moving past a mixer. A second paper cover sheet is applied thereover and the resultant assembly is formed into the shape of a panel. Calcium sulfate hemihydrate reacts with a sufficient amount of the water to convert the hemihydrate into a matrix of interlocking calcium sulfate dihydrate crystals, causing it to set and to become firm. The continuous strip thus formed is conveyed on a belt until the calcined gypsum is set, and the strip is thereafter cut to form boards of desired length, which boards are conveyed through a drying kiln to remove excess moisture. Since each of these steps takes only minutes or seconds, small changes in any of the process steps can lead to gross inefficiencies in the manufacturing process.

Installers prefer light weight boards to reduce fatigue on the job. Additionally, heavy panels are costly to transport. The foam introduces voids into the gypsum core that reduce the weight, however if the size of the voids is not controlled, problems with the product may occur. Very large bubbles can cause aesthetic problems. Strength is reduced when small bubbles leave as many tiny voids in the core. Ideally, a distribution of large and small bubbles is desired to produce a board of high strength yet light weight. In addition to affecting the strength and weight of the finished board, mixing foam into the gypsum slurry decreases the fluidity of the slurry.

Dispersants are known for use with gypsum that help fluidize the mixture of water and calcium sulfate hemihydrate to increase the flowability of the slurry. Naphthalene sulfonate dispersants are well known, but have limited efficacy. Polycarboxylate dispersants are commonly used with cements and, to a lesser degree, with gypsum. The addition of one or more dispersants can be used to increase the fluidity when foam is added.

Further, it has been found that the addition of dispersants to a foamed gypsum slurry changes the size distribution of foam bubbles and the voids they leave behind. Some dispersants cause the boards to have an unusual appearance which may be objectionable to the end user. Very large bubbles at the paper interface cause blisters on the board surface. Other dispersants make very tiny bubbles which can decrease the strength.

Dispersants can also retard the set of the gypsum slurry, further complicating high-speed manufacture of gypsum products such as wallboard. If a dispersant dose is increased to improve fluidity, set time may increase. When the wallboard is not sufficiently set at the cutting knife, the product will not hold its shape and will be damaged by handling of the board after it is cut. Reduction in the speed of the line may be necessary to allow the board to harden and maintain its shape.

This complex relationship between the dispersant chemistry, foam bubble size, set time and slurry fluidity makes it difficult to produce a gypsum slurry having both the desired bubble size distribution and fluidity without significantly increasing set time. U.S. Pat. No. 6,264,739 assigned to Kao Corporation, discloses the use of a polymeric dispersant for use in wallboard that stabilizes the foam. This reference describes a polyalkylene glycol monoester monomer having 2 to 300 moles of oxyalkylene groups, each having 2 to 3 carbon atoms and an acrylic repeating unit. The only method disclosed for adding the dispersant is by adding the dispersant to the plaster powder together with surfactants. No mention is made of controlling bubble size or bubble size distribution for controlled core structure, only of stabilizing the foam.

It has been found, however, that polycarboxylate dispersants may result in a foam that is too stable in a gypsum slurry. Stable bubbles do not coalesce into larger bubbles. Often this results in a weaker board because the bubble size distribution includes an excess of small bubbles.

Thus there is a need for a method to effectively utilize foam and dispersants together to obtain a gypsum core that is both strong and lightweight. Further, the method should accomplish this while maintaining the high fluidity and the set time necessary to efficiently make products.

SUMMARY

Improved solutions to these and other problems are met or exceeded by the current method which consistently produces a foamed panel from gypsum, two or more dispersants and foam, wherein the bubble size distribution is controlled to produce a mixture of large and small bubbles. Bubble size distribution is controlled without decreasing the slurry fluidity or significantly increasing the set time.

More specifically, in a method of effectively utilizing dispersant in wallboard containing foam includes providing a melamine sulfonate condensate dispersant (“melamine dispersant”) and a polycarboxylate dispersant. Stucco and gauging water are mixed to form a gypsum slurry. One of the group consisting of the melamine dispersant and the polycarboxylate dispersant is selected for addition to the foam water, then added to the foam water. A foam is formed from the foam water and at least one foaming agent. The other of the group consisting of the polycarboxylate dispersant and the melamine dispersant is added to either the gauging water or the foam water. After both dispersants have been added to the selected water-based composition, the foam and the gypsum slurry are combined to make a foamed slurry, which is then formed into a panel. The panel is then allowed to set.

Selection of dispersants of different chemical types between the gauging water and the foam water allows for increased control in the foam bubble size. The addition of a melamine dispersant with a polycarboxylate destabilizes the foam to create an active foam. In active foams, bubbles are continuously breaking and coalescing to maintain a broad distribution of bubble sizes. The gypsum board that is produced is stronger than those made having a static foam.

The use of dispersants in this manner also results in better slurry fluidity than is accomplished when the total amount of dispersant is added to the mixer. This is true even if the same dispersant is added to the mixer and the foam. Improved slurry fluidity means that the amount of dispersant necessary to achieve acceptable fluidity is less. Reducing the total amount of dispersant also reduces the probability that the set time of the slurry will be significantly retarded, leading to difficulties in manufacture.

Additional embodiments of the invention utilize at least two foaming agents to generate the foam. One foaming agent is selected to generate a stable foam, while the other foaming agent is selected to generate an unstable foam. In these embodiments, both the melamine dispersant and the polycarboxylate dispersant are usable in either the foam water or the gauging water. Selection of the appropriate foaming agents allows for additional control of the foam bubbles.

Further, implementation of some embodiments of this process allows the user greater manufacturing flexibility. By merely changing the dispersant to the foam water or to the mixer, either fluidity or bubble size distribution can be varied. The process changes are obtainable without modifications to existing equipment after pumps and switches are in place. An extra degree of control is added to the process.

Unlike naphthalene sulfonate dispersants, the use of melamine sulfonate condensates does not cause thickening of the slurry when polycarboxylate dispersants are also used. The efficacy of the dispersant package is maintained while still allowing for control of the foam bubble size.

DETAILED DESCRIPTION

Gypsum panels are made using at least a melamine dispersant and a polycarboxylate dispersant. In one embodiment, one of the group consisting of the melamine dispersant and the polycarboxylate dispersant is added to the foam water, while the polycarboxylate dispersant is added to either the gauging water or the foam water. In a second embodiment, the melamine dispersant and the polycarboxylate dispersant are independently added to either the gauging water or the foam water. A portion of at least one of the first and second dispersants is added to the foam water. In other embodiments, portions of both the first and second dispersants are added to at least one of the slurry, the foam, or both the slurry and the foam.

The first dispersant is a melamine dispersant, such as a melamine formaldehyde condensate. It is preferably used in amounts of about 10% to about 50% of the total dispersant on a dry weight basis. Another preferred amount of first dispersant is about 15% to about 25% of the total amount of dispersant on a weight basis. For a ⅝-inch board, the first dispersant is preferably present in amounts of up to 3 lbs/MSF, more preferably up to 2 lb/MSF and more preferably up to 1 lb/MSF, where "MSF" is defined as 1000 $ft^2$ of board surface as measured by the surface of one major face. As the ratio of melamine dispersant to PCE dispersant decreases, the cost of the dispersant package increases. Raising the ratio of the melamine dispersant to the PCE dispersant reduces the cost, but also reduces the efficacy of the total dispersant package. The optimum ratio depends upon the type of calcined gypsum selected, the exact dispersants chosen, and the selection of the foaming agent.

Use of different dispersants in the gauging water and the foam water can be used advantageously. Distribution of bubble size can be optimized by the use of different dispersants to make the slurry and the foam. Some polycarboxylate dispersants added at the mixer have generally been found to result in very small foam bubbles when the foam is combined with the gypsum slurry. These include MELFLUX 2641 F, MELFLUX 2651 F and MELFLUX PCE dispersants, which are products of BASF Construction Polymers, GmbH (Trostberg Germany) and are supplied by BASF (Trostberg, Germany) (hereafter, "BASF"). (MELFLUX is a registered trademark of BASF.) All of these dispersants have an ether linkage between the oxyalkylene chain and the polymer backbone as shown in Formula I below. Other dispersants, including naphthalene sulfonate dispersants, destabilize the foam and create very large bubbles. Examples of suitable melamine sulfonate dispersants include MELMENT F15G, MELMENT F17G and MELMEMT L17G, made by BASF.

One of the preferred polycarboxylic ether dispersants, referred to as the "MELFLUX PCE" dispersants, was used in the slurry and includes two repeating units. MELFLUX PCE dispersants are disclosed in additional detail in U.S. Patent Application Publication No. 2006/0278130, entitled, "Gypsum Products Using a Two-Repeating Unit Dispersant and Method for Making Them"; U.S. Patent Application Publication No. 2006/0281886, entitled "Polyether-Containing Copolymer; hereby incorporated by reference. The MELFLUX PCE dispersants vary by molecular weight, the number of repeating units and by charge density, but are all generally described by the formula discussed below. Other polymers in this series known to be useful in wallboard include MELFLUX PCE 211 L/35% ND, MELFLUX PCE 267 L/35% ND, MELFLUX PCE 356 L/35% ND, MELFLUX PCE 410 L/35% FF and MELFLUX PCE 111 L/35% ND, all by BASF.

The first repeating unit of the MELFLUX PCE dispersant is an olefinic unsaturated mono-carboxylic acid repeating unit, an ester or salt thereof, or an olefinic unsaturated sulfonic acid repeating unit or a salt thereof. Preferred repeating units include acrylic acid or methacrylic acid. Mono- or divalent salts are suitable in place of the hydrogen of the acid group. The hydrogen can also be replaced by a hydrocarbon group to form the ester.

The second repeating unit satisfies Formula I,

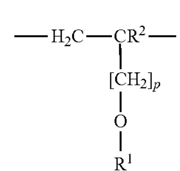

I and $R^1$ is derived from an unsaturated (poly)alkylene glycol ether group according to Formula II:

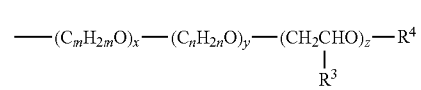

II

Referring to Formula I, the alkenyl repeating unit optionally includes a $C_1$ to $C_3$ alkyl group between the polymer backbone and the ether linkage. The value of p is an integer from 0-3, inclusive. Preferably, p is either 0 or 1. $R^2$ is either a hydrogen atom or an aliphatic $C_1$ to $C_5$ hydrocarbon group, which may be linear, branched, saturated or unsaturated. Examples of preferred repeating units include acrylic acid and methacrylic acid.

The polyether group of Formula II contains multiple $C_2$-$C_4$ alkyl groups, including at least two different alkyl groups, connected by oxygen atoms. M and n are integers from 2 to 5, inclusive, and preferably, at least one of m and n is 2. X and y are integers from 1-to 350, inclusive. The value of z is from 0 to 200, inclusive. $R^3$ is a non-substituted or substituted aryl group and preferably phenyl and $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming at least one of Formula III(a), III(b) and III(c).

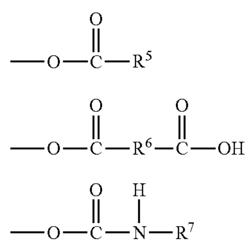

In the above formulas, $R^5$ and $R^7$, independently of each other, represent an alkyl, aryl, aralkyl or alkylaryl group. $R^6$ is a bivalent alkyl, aryl, aralkyl or alkylaryl group.

The molecular weight of the dispersant is preferably from about 20,000 to about 60,000 Daltons. Surprisingly, it has been found that the lower molecular weight dispersants cause more retardation of set time than dispersants having a molecular weight greater than 60,000 Daltons. However, tests with gypsum indicate that efficacy of the dispersant is reduced at molecular weights above 60,000 Daltons.

Other useful dispersants that are known ("2641-Type") are disclosed in U.S. Pat. No. 6,777,517, herein incorporated by reference. Preferably, the dispersant includes at least three repeating units shown in Formula IV(a), IV(b) and IV(c).

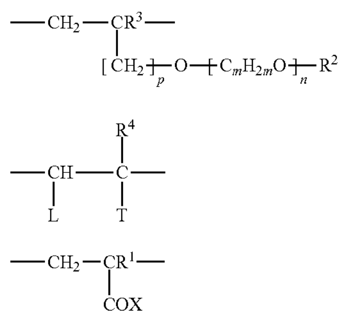

In this case, both acrylic and maleic acid repeating units are present, yielding a higher ratio of acid groups to vinyl ether groups. $R^1$ represents a hydrogen atom or an aliphatic hydrocarbon radical having from 1 to 20 carbon atoms. X represents OM, where M is a hydrogen atom, a monovalent metal cation, an ammonium ion or an organic amine radical. $R^2$ can be hydrogen, an aliphatic hydrocarbon radical having from 1 to 20 carbon atoms, or a cycloaliphatic hydrocarbon radical having from 6 to 14 carbon atoms, which may be substituted. $R^3$ is hydrogen or an aliphatic hydrocarbon radical having from 1 to 5 carbon atoms, which are optionally linear or branched, saturated or unsaturated. $R^4$ is hydrogen or a methyl group, depending on whether the structural units are acrylic or methacrylic. Preferably, L is hydrogen, —$COO_aM$ or —$COOR^5$, where a is ½ or 1 and M is as defined above. $R^5$ is an aliphatic hydrocarbon radical having from 3 to 20 carbon atoms, a cycloaliphatic hydrocarbon radical having from 5 to 8 carbon atoms or an aryl radical having from 6 to 14 carbon atoms. T is preferably —$COOR^5$, where $R^5$ is as defined above. Additional values for L and T are taught in U.S. Pat. No. 6,777,517, previously incorporated by reference. P can be from 0 to 3. M is an integer from 2 to 4, inclusive, and n is an integer from 0 to 200, inclusive. Dispersants of this family are sold by BASF as MELFLUX 2641F, MELFLUX 2651F and MELFLUX 2500 dispersants. The use of 2641-Type dispersants in gypsum slurries is described in U.S. Ser. No. 11/152,661, filed Jun. 14, 2005, entitled "Fast Drying Wallboard", previously incorporated by reference.

Yet another preferred dispersant is sold by BASF as MELFLUX 1641 ("1641-Type"). This is another dispersant made primarily of two components, as shown in Formula V. This dispersant is made primarily of two repeating units, one a vinyl ether and the other a vinyl ester. In Formula V, m and n are the mole ratios of the component repeating units, which can be randomly positioned along the polymer chain.

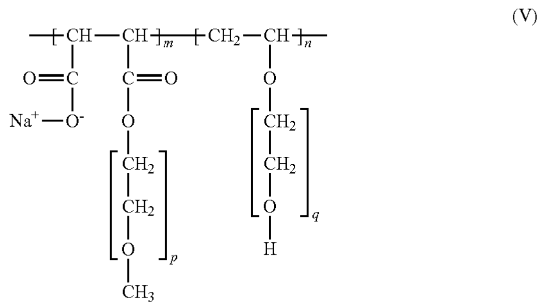

Polymerization of the monomers is carried out by any method known by an artisan. One preferred method of making the polymer is taught in U.S. Pat. No. 5,798,425, hereby incorporated by reference.

These dispersants are particularly well-suited for use with gypsum. While not wishing to be bound by theory, it is believed that the acid repeating units bind to the gypsum crystals while the long polyether chains of the second repeating unit perform the dispersing function. Since it is less retardive than other dispersants, it is less disruptive to the manufacturing process of gypsum products such as wallboard. The dispersant is used in any effective amount. To a large extent, the amount of dispersant selected is dependent on the desired fluidity of the slurry. As the amount of water decreases, more dispersant is required to maintain a constant slurry fluidity. Preferably, the total amount of dispersants used is about 0.01% to about 0.5% based on the dry weight of the stucco. More preferably, the dispersant is used in amounts of about 0.05% to about 0.2% on the same basis. In measuring a liquid dispersant, only the weight of the polymer solids are considered in calculating the dosage of the dispersant, and the water from the dispersant is considered when a water/stucco ratio is calculated.

The stucco, also known as calcium sulfate hemihydrate or calcined gypsum, is present in amounts of at least 50% of the dry materials. Preferably, the amount of stucco is at least 80%. In many wallboard formulations, the dry component material is more than 90% or even 95% calcium sulfate hemihydrate. The method of calcination is not important, and either alpha or beta-calcined stucco is suitable. Use of calcium sulfate anhydrite is also contemplated, although it is preferably used in small amounts of less than 20%.

Water is added to the stucco in any amount that makes a flowable slurry. The amount of water to be used varies greatly according to the application with which it is being used, the exact dispersant being used, the properties of the stucco and the additives being used. The water to stucco ratio ("WSR") for wallboard is preferably about 0.1 to about 0.8 based on the dry weight of the stucco. Commonly, a WSR of about 0.2 to about 0.6 is preferred. Flooring compositions preferably use a WSR from about 0.17 to about 0.45, preferably from about 0.17 to about 0.34. Moldable or castable products preferably use water in a WSR from about 0.1 to about 0.3, preferably from about 0.16 to about 0.25. The WSR can be reduced to 0.1 or less in laboratory tests based on the moderate addition of the MELFLUX PCE dispersants.

When calculating the WSR, water from all sources is taken into account. A portion of the added water, so-called "foam water," is used to make foam when pregenerated foam is added at the mixer or mixer outlet. Some additives are used in an aqueous solution or use water as a carrier. The rate of water to be charged to the mixer, known as the "gauging water," is calculated as the difference between the water needed to produce a desired WSR and the water available from the foam and other sources.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

Foamed gypsum is prepared by incorporating foam into a gypsum slurry by any means known in the art. Preferably, the foam is incorporated into the gypsum slurry by mixing a prepared foam into the slurry.

Any conventional foaming agent known to be useful in preparing foamed set gypsum products can be employed. Many such foaming agents are well known and readily available commercially, e.g. the HYONIC line of soaps from GEO Specialty Chemicals, Ambler, Pa. Foams and a preferred method for preparing foamed gypsum products are disclosed in U.S. Pat. No. 5,683,635, herein incorporated by reference. Preferably, the foaming agent is a mixture of at least a first and a second foaming agent. The first foaming agent advantageously forms an unstable foam, while the second foaming agent advantageously forms a stable foam. This mixture produces an active foam in which small bubbles coalesce to make larger bubbles. Bubble coalescence results in a wide distribution in bubble sizes that makes a strong gypsum panel. Use of additional foaming agents is contemplated. For further descriptions of useful foaming agents, see, for example: U.S. Pat. Nos. 4,676,835; 5,158,612; 5,240,639 and 5,643,510; and PCT International Application Publication WO 95116515, published Jun. 22, 1995, herein incorporated by reference. Either the first or second foaming agent, or both, may be a mixture of foaming agents.

In many cases it will be preferred to form relatively large voids in the gypsum product, in order to help maintain its strength. This can be accomplished by employing a foaming agent that generates foam that is relatively unstable when in contact with calcined gypsum slurry. Preferably, this is accomplished by blending a major amount of foaming agent known to generate relatively unstable foam, with a minor amount of foaming agent known to generate relatively stable foam.

Such a foaming agent mixture can be pre-blended "off-line", i.e., separate from the process of preparing the foamed gypsum product. However, it is preferable to blend the first and second foaming agents concurrently and continuously, as an integral "on-line" part of the mixing process. This can be accomplished, for example, by pumping separate streams of the different foaming agents and bringing the streams together at, or just prior to, a foam generator that is employed to generate the stream of aqueous foam which is then inserted into and mixed with the calcined gypsum slurry. By blending in this manner, the ratio of the first and second foaming agents in the blend can be simply and efficiently adjusted (for example, by changing the flow rate of one or both of the separate streams) to achieve the desired void characteristics in the foamed set gypsum product. Such adjustment will be made in response to an examination of the final product to determine whether such adjustment is needed. Further description of such "on-line" blending and adjusting can be found in U.S. Pat. Nos. 5,643,510 and 5,683,635.

An example of the first foaming agent, useful to generate unstable foams, has the formula:

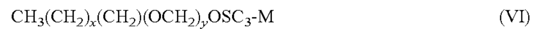

$$CH_3(CH_2)_x(CH_2)(OCH_2)_yOSC_3\text{-}M \quad \text{(VI)}$$

wherein X is a number from 2 to 20, Y is a number from 0 to 10 and is greater than 0 in at least 50 weight percent of the foaming agent, and M is a cation.

An example of the second foaming agent, useful to generate stable foams, has the formula:

$$R\text{—}OSC_3\text{-}M \quad \text{(VII)}$$

wherein R is an alkyl group containing from 2 to 20 carbon atoms, and M is a cation. Preferably, R is an alkyl group containing from 8 to 12 carbon atoms.

For either the first or second foaming agent, the cation includes at least one of sodium, potassium, magnesium, ammonium, quaternary ammonium and mixtures thereof.

In some preferred embodiments of the invention, the first and second foaming agents are combined prior to purchase. In such cases, the portion of the combined foaming agent wherein Y is 0 (corresponding to the second foaming agent), constitutes from 86 to 99 weight percent of the resultant blend of foaming agents. X and M are defined as for the separate formulas described above.

The gypsum slurry also optionally includes one or more modifiers that enhance the action of the polycarboxylate dispersant. The two-repeating unit dispersant used here is particularly susceptible to the effects of the modifiers. Preferred modifiers include cement, lime, quicklime or calcium oxide, slaked lime, also known as calcium hydroxide, soda ash, also known as sodium carbonate, potassium carbonate, also known as potash, and other carbonates, silicates, phosphonates and phosphates. When modifiers are used, the efficacy of the dispersant is boosted to achieve a new level of fluidity, or the amount of polycarboxylate dispersant can be decreased to reduce the polycarboxylate expense. Additional information on modifiers and their use is found in U.S. Ser. No. 11/152,317 entitled "Modifiers For Polycarboxylate Dispersants." filed Jun. 14, 2005 and hereby incorporated by reference. The modifiers are used in the gypsum slurry in any suitable amount. Preferably, the modifiers are used in amounts from about 0.01% to about 2% by weight based on the dry stucco. More preferably, the modifiers are used in amounts of about 0.03% to about 0.5% and even more preferably, from about 0.05% to about 0.5%.

It has been discovered that if the stucco is exposed to the dispersant before the modifier is exposed to the dispersant, then the modifier is rendered less effective. Preferably the modifier and the dispersant are both predissolved in the gauging water, forming a solution. The modifier and the dispersant are added in any order, either sequentially or essentially simultaneously. After the solution is formed, the stucco is mixed with the solution, exposing the stucco to both the dispersant and the modifier simultaneously. When both the modifier and dispersant are in dry form, they can be mixed together and added with the dry stucco. The preferred method for combining a modifier, dispersant and stucco is further described in U.S. Ser. No. 11/152,323, entitled "Method of Making a Gypsum Slurry with Modifiers and Dispersants", hereby incorporated by reference.

In another embodiment, the modifier is mixed with a portion of the gauging water to form a modifier slurry. The modifier slurry is then mixed with the remaining gauging water and the dispersant, either simultaneously or sequentially, to form the three-component solution. In either case, both the modifier and the dispersant are blended in the gauging water prior to introduction of the dry components.

In some embodiments of the invention, additives are included in the gypsum slurry to modify one or more properties of the final product. Additives are used in the manner and amounts as are known in the art. Frequently these and other additives are in solid, powder or granular form and are added to the dry components before the slurry is mixed. Concentrations are reported in amounts per 1000 square feet of finished board panels ("MSF").

A trimetaphosphate compound is added to the gypsum slurry in some embodiments to enhance the strength of the product and to improve sag resistance of the set gypsum. Preferably the concentration of the trimetaphosphate compound is from about 0.07% to about 2.0% based on the weight of the calcined gypsum. Gypsum compositions including trimetaphosphate compounds are disclosed in U.S. Pat. Nos. 6,342,284 and 6,632,550, both herein incorporated by reference. Exemplary trimetaphosphate salts include sodium, potassium or lithium salts of trimetaphosphate, such as those available from Astaris, LLC., St. Louis, Mo. Care must be exercised when using trimetaphosphate with lime or other modifiers that raise the pH of the slurry. Above a pH of about 9.5, the trimetaphosphate loses its ability to strengthen the product and the slurry becomes severely retardive.

Other additives are also added to the slurry as are typical for the particular application to which the gypsum slurry will be put. Set retarders (up to about 2 lb./MSF (9.8 g/m2)) or dry accelerators (up to about 35 lb./MSF (170 g/m2)) are added to modify the rate at which the hydration reactions take place. Climate Stable Accelerator or "CSA" is a set accelerator comprising 95% calcium sulfate dihydrate co-ground with 5% sugar and heated to 250° F. (121° C.) to caramelize the sugar. CSA is available from USG Corporation, Southard, Okla. plant, and is made according to U.S. Pat. No. 3,573,947, herein incorporated by reference. Potassium sulfate is another preferred accelerator. HRA is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators.

Another accelerator, known as wet gypsum accelerator or WGA, is also a preferred accelerator. A description of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m$^2$) of board product.

Other potential additives to the wallboard are biocides to reduce growth of mold, mildew or fungi. Depending on the biocide selected and the intended use for the wallboard, the biocide can be added to the covering, the gypsum core or both. Examples of biocides include boric acid, pyrithione salts and copper salts. Biocides can be added to either the covering or the gypsum core. When used, biocides are used in the coverings in amounts of less than 500 ppm.

In addition, the gypsum composition optionally can include a starch, such as a pregelatinized starch or an acid-modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 Starch, commercially available from Lauhoff Grain Company and AMERIKOR818 and HQM PREGEL starches, both commercially available from Archer Daniels Midland Company. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Starches such as USG95 (United States Gypsum Company, Chicago, Ill.) are also optionally added for core strength.

Other known additives may be used as needed to modify specific properties of the product. Glass fibers are optionally added to the slurry in amounts of up to 11 lb./MSF (54 g/). Up to 15 lb./MSF (73.2 g/m$^2$) of paper fibers are also added to the slurry. Wax emulsions are added to the gypsum slurry in amounts up to 90 lb./MSF (0.439 kg/m$^2$) to improve the water resistance of the finished gypsum board panel. Sugars, such as dextrose, are used to improve the paper bond at the ends of the boards. Wax emulsions or polysiloxanes are used for water resistance. If stiffness is needed, boric acid is commonly added. Fire retardancy can be improved by the addition of vermiculite. These and other known additives are useful in the present slurry and wallboard formulations.

In operation, the stucco is moved toward a mixer. Prior to entry into the mixer, dry additives, such as starches, or set accelerators, are added to the powdered stucco. Some additives are added directly to the mixer via a separate line. Trimetaphosphate is added using this method in the examples described below. Other additives may also be added to the gauging water. This is particularly convenient where the additives are in liquid form. For most additives, there is no criticality regarding placing the additives in the slurry, and they may be added using whatever equipment or method is convenient.

However, when using the dispersant according to this invention, it is important to select a first portion of the dispersant for addition to the gauging water prior to addition of the stucco. The first portion of the dispersant includes some or all of the first dispersant, the second dispersant or both. Gauging water is added at the mixer at a rate needed to meet the target water to stucco ratio when water from other sources has been taken into account. If one or more modifiers are being used, the modifier is also added to the water prior to stucco addition. After the first portion of the dispersant and the modifier are combined, the stucco is added to the resulting solution.

Meanwhile, foam is generated by combining the soap, a second portion of dispersant and the foam water. The second portion of dispersant includes the first dispersant, the second dispersant or both, that are not included in the first portion. The foam is then injected into the moving gypsum slurry after it exits from the mixer through a hose or chute. A foam ring is an apparatus having multiple ports that are arranged in a ring perpendicular to the axis of the hose. The ports are aimed toward the center of the ring so that foam is introduced under pressure into the gypsum slurry as the slurry passes through the foam ring. The slurry and the foam are united to make a foamed slurry.

After the foam and the slurry have been united, the resulting foamed slurry moves toward and is poured onto a conveyor lined with one facing material. A piece of facing material is placed on top of the slurry, forming a sandwich with the slurry between the two facing materials. The sandwich is fed to a forming plate, the height of which determines the thickness of the board. Next the continuous sandwich is cut into appropriate lengths at the cutting knife, usually eight feet to twelve feet.

The boards are then moved to a kiln for drying. Temperatures in the kiln typically range to 450° F. to 500° F. maximum. Preferably there are three or more temperature zones in the kiln. In the first zone contacted by the wet board, the temperature increases to the maximum temperature, while the temperature slowly decreases in the last two zones. The blower for the first zone is positioned at the exit of the zone, blowing the air countercurrent to the direction of board travel. In the second and third zones, the blowers are located at the entrance to the zone, directing the hot air co-current with board travel. Heating that is less severe in the last zone prevents calcination of dry areas of the board, causing poor paper bond. A typical residence time in the kiln is about forty minutes, but the time will vary depending on the line capacity, the wetness of the board and other factors.

EXAMPLE 1

A plant trial was conducted to confirm the above results in a commercial setting. Dispersants for use on a board line were prepared as follows:

TABLE 1

| Package | Primary Dispersant | Amount Primary Dispersant | Secondary Dispersant | Amount Secondary Dispersant |
|---|---|---|---|---|
| B | PCE 267 | 3.25 lb/MSF | None | 0 |
| E | PCE 267 | 3.0 lb/MSF | Melment L17G | 1.0 lb/MSF |
| Q | PCE 267 | 6.0 lb/MSF | None | |

Gypsum panels ⅝ inches in thickness were made continuously on a board manufacturing line. Stucco was used at 1857 lb/MSF. Dry components, such as HRA, dextrose and starch, were added to the stucco as it was conveyed to the mixer using auger feeders. Starch was added at the rate of 5 lb/MSF. Three pounds per MSF dextrose was added to all samples. In samples B and E, HRA was 13.5 lb/MSF, while sample Q used 13.0 lb/MSF HRA.

The dry components were fed to a high-shear pin mixer. Gauging water entered the mixer at the rate of 1227 lb/MSF. Liquid components, including the dispersant packages described in Table 1 and 0.6 lb/MSF of sodium trimetaphosphate, were added directly to the mixer via a separate feed line. The amount of dispersant was selected to produce a slurry having a constant fluidity as measured by a slump test.

The fluidity of each slurry was measured by means of a slump test. A slurry sample was poured into a damp 2"×4" (5 cm×10 cm) cylinder placed on a plastic sheet, slightly overfilling the cylinder. Excess material was screeded from the top, then the cylinder was lifted up smoothly, allowing the slurry to flow out the bottom, making a patty. The patty was measured (±⅛") in two directions 90° apart, and the average reported as the patty diameter. Slurries of similar fluidity yield patties of the same or similar diameter.

Foam was generated by combining soap with 105 lb/MSF foam water. Samples B and E contained 0.32 lb/MSF total soap, while Sample Q included 0.33 lb/MSF soap. In all cases, 95% of the soap was CEDEPAL 8515 soap while 5% was CEDEPAL FA-403, both from Stepan Company, Northfield, Ill. Sufficient air was used to generate foam with a weight of 5 lbs/ft$^3$. The foam was discharged through a foam ring which forced the foam under pressure into the gypsum slurry as the slurry passes through the ring.

The foamed slurry traveled to the board line in a soft, pliable boot where it was deposited on a paper facing sheet and spread across the width of the sheet. A second paper facing sheet was applied to the top of the slurry, forming a sandwich of continuous gypsum board. The sandwich then passed under a forming plate to press the facing into the soft slurry and to level the forming board to a consistent thickness.

Properties of Samples B, E and Q are shown in Table 2 below.

TABLE 2

| Sample | B | E | Q |
|---|---|---|---|
| Compressive Strength, psi | 315 | 398 | 317 |
| Core Hardness, lbs | 36 | 45 | 28 |

Core hardness was tested by ASTM Standard C1396, hereby incorporated by reference. The combination of the PCE 267 dispersant with a melamine sulfonate dispersant of Sample E shows improved compressive strength and core hardness compared to Samples B and Q using the dispersant without the melamine sulfonate component. Although the amounts of dispersant are not constant, Sample B has the least total dispersant and Sample Q has the most total dispersant. Sample E, having an intermediate amount of total dispersant, clearly has the best values for compressive strength and core hardness of any of the samples.

While a particular embodiment of the method of controlling the distribution of foam bubble size in a gypsum slurry has been shown and described, it will be appreciated by those skilled in the art that changes and modifications may be made thereto without departing from the invention in its broader aspects and as set forth in the following claims.

What is claimed is:

1. A method of preparing a foamed gypsum panel, comprising:

a). mixing stucco and gauging water to form a gypsum slurry, b). selecting one of the group consisting of a melamine sulfonate dispersant and a polycarboxylate dispersant;

c). adding the selected dispersant to water which will be foamed;

d). generating a foam from a combination described in step c). and at least one foaming agent;

e). adding the other of the group consisting of the polycarboxylate dispersant and the melamine dispersant to at least one of the gauging water and the water which will be foamed, wherein the melamine dispersant is used in the amount 25% by weight of the total weight of all dispersants;

f). uniting the foam and the gypsum slurry to make a foamed slurry;

g). forming the foamed slurry into a panel; and h). allowing the panel to set.

2. A method of preparing a foamed gypsum panel, comprising:

a). selecting a polycarboxylate dispersant having an ether linkage between an oxyalkylene chain and a polymer backbone;

b). mixing stucco and gauging water to form a gypsum slurry;

c). adding a melamine dispersant to at least one of the gauging water and water which will be foamed, wherein the melamine dispersant is used in the amount 25% by weight of the total weight of all dispersants d) including the polycarboxylate dispersant in at least one of the gauging water and the water which will be foamed;

e). generating a foam from a combination described in step d). and at least one foaming agent;

f). combining the foam with the slurry to make a foamed slurry;

g). forming the foamed slurry into a panel; and h). allowing the panel to set.

3. A method of making a wallboard panel comprising:

a). selecting the polycarboxylate dispersant having an ether linkage between an oxyalkylene chain and a polymer backbone;

b). mixing stucco and gauging water to form a gypsum slurry;

c). forming a foam from water which will be foamed and at least one foaming agent;

d). adding a melamine dispersant to at least one of the gauging water and the foam water, wherein the melamine dispersant is used in the amount 25% by weight of the total weight of all dispersants;

e). adding the polycarboxylate dispersant to at least one of the gauging water and the water which will be foamed;

f). combining the foam with the slurry after both of said adding steps and thereby forming a foamed slurry;

g). pouring the foamed slurry between two sheets of covering material;

h). forming the foamed slurry into a panel; and i). allowing the panel to set.

4. The method of claim 1, wherein said generating step d) further comprises choosing two or more foaming agents, wherein at least one foaming agent is chosen to make a stable foam and at least one other foaming agent is chosen to make an unstable foam.

5. The method of claim 1, wherein said uniting step f) further comprises introducing foam into the gypsum slurry through a foam ring.

6. The method of claim 1 further comprising selecting a modifier and adding the polycarboxylate dispersant and the modifier to the gauging water to form a solution prior to said mixing step a), and wherein the modifier is selected from the group consisting of cement, lime, silicates, carbonates and phosphates.

7. The method of claim 2, wherein said generating step e) further comprises choosing two or more foaming agents, wherein at least one foaming agent makes a stable foam and at least one other foaming agent makes an unstable foam.

8. The method of claim 2, wherein said combining step f) comprises introducing foam into the gypsum slurry through a foam ring.

9. The method of claim 2, wherein said step d) further comprises picking a modifier and adding the polycarboxylate dispersant and the modifier to the gauging water to form a solution prior to said mixing step b), wherein the modifier is selected from the group consisting of cement, lime, silicates, carbonates and phosphates.

10. The method of claim 2, wherein all of the dispersants are added to the water which will be foamed.

11. The method of claim 2, wherein all of the dispersants are added to the gauging water.

* * * * *